US011088821B2

(12) United States Patent
Troia et al.

(10) Patent No.: US 11,088,821 B2
(45) Date of Patent: Aug. 10, 2021

(54) SECURE COMMUNICATION IN A TRAFFIC CONTROL NETWORK

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 61 days.

(21) Appl. No.: 16/363,126

(22) Filed: Mar. 25, 2019

(65) Prior Publication Data

US 2020/0313848 A1 Oct. 1, 2020

(51) Int. Cl.
| | | |
|---|---|---|
| G08G 1/09 | (2006.01) | |
| H04L 9/00 | (2006.01) | |
| H04W 4/44 | (2018.01) | |
| G08G 1/087 | (2006.01) | |
| G08G 1/01 | (2006.01) | |
| H04W 12/71 | (2021.01) | |

(52) U.S. Cl.
CPC ............ *H04L 9/006* (2013.01); *G08G 1/0112* (2013.01); *G08G 1/087* (2013.01); *H04W 4/44* (2018.02); *H04W 12/71* (2021.01)

(58) Field of Classification Search
CPC .. H04L 9/006; H04W 4/44; H04W 12/00512; G08G 1/0112; G08G 1/087
USPC ........................................................ 340/905
See application file for complete search history.

(56) References Cited

U.S. PATENT DOCUMENTS

| | | | | |
|---|---|---|---|---|
| 5,014,052 A | * | 5/1991 | Obeck .................... | G08G 1/087 340/906 |
| 5,926,113 A | * | 7/1999 | Jones ..................... | G08G 1/087 340/906 |
| 6,064,319 A | * | 5/2000 | Matta ...................... | G08G 1/07 340/902 |
| 6,326,903 B1 | * | 12/2001 | Gross .................... | G08G 1/087 340/902 |

(Continued)

FOREIGN PATENT DOCUMENTS

| | | |
|---|---|---|
| KR | 10-1695616 B1 | 1/2017 |
| WO | 2006-089584 A1 | 8/2006 |

OTHER PUBLICATIONS

Microsoft, DICE: Device Identifier Composition Engine, 2015 (Year: 2015).*

(Continued)

*Primary Examiner* — Zhen Y Wu
(74) *Attorney, Agent, or Firm* — Brooks, Cameron & Huebsch, PLLC

(57) ABSTRACT

The present disclosure includes apparatuses, methods, and systems for secure communication in a traffic control network. An embodiment includes a memory, and circuitry configured to receive a traffic control public key from a traffic control device, wherein the traffic control public key is received in response to providing, to the traffic control device, a request to modify content of the traffic control device, encrypt data corresponding to vehicle information using the traffic control public key, provide, to the traffic control device, the encrypted data to store the data in the traffic control device, and access a network of traffic control devices, including the traffic control device, via the data stored in the traffic control device.

30 Claims, 9 Drawing Sheets

(56) References Cited

U.S. PATENT DOCUMENTS

| | | | | |
|---|---|---|---|---|
| 6,622,247 | B1* | 9/2003 | Isaak | H04L 9/3263 |
| | | | | 713/155 |
| 7,098,806 | B2* | 8/2006 | Bachelder | G08G 1/087 |
| | | | | 340/906 |
| 7,113,108 | B1* | 9/2006 | Bachelder | G08G 1/042 |
| | | | | 340/906 |
| 7,116,245 | B1* | 10/2006 | Bachelder | G08G 1/087 |
| | | | | 340/906 |
| 7,307,547 | B2* | 12/2007 | Schwartz | G08G 1/087 |
| | | | | 340/906 |
| 7,327,280 | B2* | 2/2008 | Bachelder | F41G 9/00 |
| | | | | 340/902 |
| 8,520,695 | B1* | 8/2013 | Rubin | G01C 21/26 |
| | | | | 370/445 |
| 8,610,596 | B2* | 12/2013 | Johnson | G08G 1/097 |
| | | | | 340/906 |
| 8,742,946 | B1* | 6/2014 | Worthy | G08G 1/087 |
| | | | | 340/906 |
| 9,691,278 | B2* | 6/2017 | Poornachandran | |
| | | | | G08G 1/096716 |
| 9,699,655 | B1* | 7/2017 | Silis | H04L 9/006 |
| 10,121,370 | B2* | 11/2018 | Elsheemy | G08G 1/0141 |
| 10,217,357 | B1* | 2/2019 | Elsheemy | G08G 1/09623 |
| 10,772,141 | B2* | 9/2020 | Cheung | H04W 12/04 |
| 2007/0063875 | A1* | 3/2007 | Hoffberg | G06Q 50/01 |
| | | | | 340/995.1 |
| 2007/0087756 | A1* | 4/2007 | Hoffberg | G06Q 20/22 |
| | | | | 455/450 |
| 2012/0262304 | A1* | 10/2012 | Cripps | G08G 1/0955 |
| | | | | 340/908 |
| 2013/0067220 | A1* | 3/2013 | Ando | H04L 9/3268 |
| | | | | 713/156 |
| 2016/0169688 | A1* | 6/2016 | Kweon | G08G 1/162 |
| | | | | 701/522 |
| 2016/0261555 | A1* | 9/2016 | Niemasz | H04L 51/28 |
| 2016/0328968 | A1* | 11/2016 | Elsheemy | B60T 7/18 |
| 2017/0032670 | A1* | 2/2017 | Poornachandran | |
| | | | | G08G 1/096716 |
| 2017/0337813 | A1 | 11/2017 | Taylor | |
| 2018/0103036 | A1* | 4/2018 | Fox | H04W 12/069 |
| 2018/0158328 | A1* | 6/2018 | Benhammou | G08G 1/042 |
| 2018/0158329 | A1* | 6/2018 | Benhammou | G08G 1/096716 |
| 2019/0206006 | A1* | 7/2019 | Lee | G06F 16/2365 |
| 2019/0349426 | A1* | 11/2019 | Smith | H04L 45/20 |

OTHER PUBLICATIONS

Sundaramoorthy, Thyag, Hashing and Public Key Cryptography for Beginners (Year: 2017).*

U.S. Appl. No. 15/853,498, entitled, "Physical Unclonable Function Using Message Authentication Code", filed Dec. 22, 2017, 28 pages.

U.S. Appl. No. 16/201,652, entitled, "Parking Infrastructure Powered By a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Runnning a Firmware or a Finite State Machine", filed Feb. 22, 2019, 42 pages.

International Search Report & Written Opinion from related International Application No. PCT/US2020/024461, dated Jul. 7, 2020, 11 pages.

* cited by examiner

SECURE COMMUNICATION IN A TRAFFIC CONTROL NETWORK

TECHNICAL FIELD

The present disclosure relates generally to semiconductor memory and methods, and more particularly, to secure communication in a traffic control network.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

DETAILED DESCRIPTION

Figure 1:
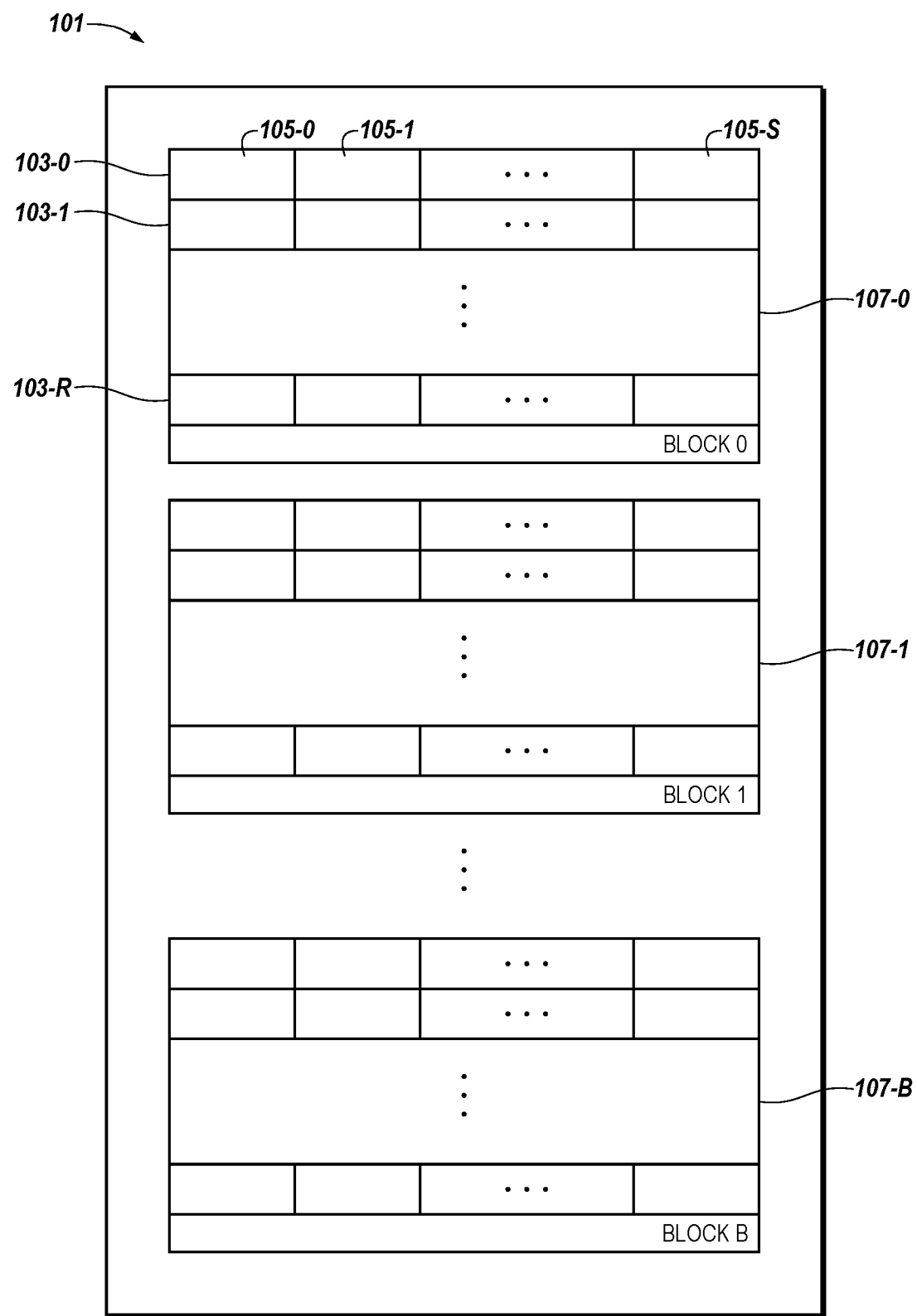
FIG. 1 illustrates a diagram of a portion of a memory array having a number of physical blocks in accordance with an embodiment of the present disclosure.

Secure communication in a traffic control network is described herein. An example apparatus includes a memory and circuitry configured to receive a traffic control public key from a traffic control device, wherein the traffic control public key is received in response to providing, to the traffic control device, a request to modify content of the traffic control device, encrypt data corresponding to vehicle information using the traffic control public key, provide, to the traffic control device, the encrypted data to store the data in the traffic control device, and access a network of traffic control devices, including the traffic control device, via the data stored in the traffic control device.

In accordance with the present disclosure, traffic control devices in a particular area can be operated as nodes of a peer-to-peer network to host a decentralized, distributed database (e.g., implemented using a block chain technique). Each node can communicate with other nodes of the network. Communication between the nodes can allow synchronization of traffic control operations. Consequently, embodiments herein can allow streamlined routing of traffic through the area. In some embodiments, vehicles in the area can be informed of the nearby presence of emergency vehicles. In some embodiments, traffic can be routed or re-routed to give priority to an emergency vehicle in the area. For example, embodiments herein can allow an emergency vehicle en route to a destination to more quickly traverse intersections and reach its destination. As a result, for example, a police vehicle can more quickly reach the scene of a crime, and an ambulance can more quickly reach the scene of an accident or more quickly remove the injured to a medical facility (e.g., a hospital). It is noted that these examples are provided for illustration and that the present disclosure is not so limited.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

As used herein, a "traffic control device" refers to a device configured to inform, guide, and/or control traffic. "Traffic" refers to pedestrian traffic, motor vehicle traffic, bicycle traffic, and other types of traffic. Traffic control devices can be associated with (e.g., located adjacent, over, or along) highways, roads, and/or other areas where traffic may be present. In some embodiments, a traffic control device can be configured to control traffic associated with an intersection of two or more roads. A traffic control device can be configured to control one or more parameters of traffic (e.g., traffic speed and/or traffic direction). Traffic control devices can control traffic via a number of traffic control components. Traffic control components can include displays, light elements, audio elements, and/or mechanical components, for instance, but are not so limited. Example traffic control devices include, but are not limited to: traffic signs, arrow boards, warning signs, variable message signs, and traffic lights.

A traffic light, as referred to herein, can include a single light element (e.g., light bulb, light-emitting diode (LED), etc.), a plurality of light element within a single housing, or one or more light elements in different housings. A traffic light can refer to one or more devices configured to control traffic through an intersection. A traffic light can, in some embodiments, include different lights that convey different meanings. For example, as known to those ordinarily skilled in the art, a red light indicates that a vehicle facing the traffic light must come to a complete stop, a green light indicates that a vehicle facing the traffic light may proceed when it is safe to do so, and a yellow light indicates that a red light will follow, and vehicle drivers must stop if it is safe to do so. In some embodiments, operations of a traffic light may be governed by a controller, circuitry, and/or computing device. In some embodiments, operations of a plurality of traffic lights (e.g., a plurality of lights associated with an intersection) may be governed by a controller, circuitry, and/or computing device.

The present disclosure makes reference to a traffic control network. A traffic control network refers to a network of traffic control devices of an area. In some embodiments, an area can refer to a settlement or locality. For example, an area can encompass a portion or an entirety of a city, a town, a municipality, a township, a zip code, a borough, a village, or a hamlet. In some embodiments, an area can be geographically defined and can be bounded by particular coordinates (e.g., latitude and longitude) and/or geographic features (e.g., roads, rivers, etc.).

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . , 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . , 107-B) can be included in a plane of memory cells, and a number of planes of memory cells can be included on a die. For instance, in the example shown in FIG. 1, each physical block 107-0, 107-1, . . . , 107-B can be part of a single die. That is, the portion of memory array 101 illustrated in FIG. 1 can be a die of memory cells.

As shown in FIG. 1, each physical block 107-0, 107-1, . . . , 107-B includes a number of physical rows (e.g., 103-0, 103-1, . . . , 103-R) of memory cells coupled to access lines (e.g., word lines). The number of rows (e.g., word lines) in each physical block can be 32, but embodiments are not limited to a particular number of rows 103-0, 103-1, . . . , 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . , 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . , 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . , 105-S (e.g., subsets of memory cells). Each physical sector 105-0, 105-1, . . . , 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
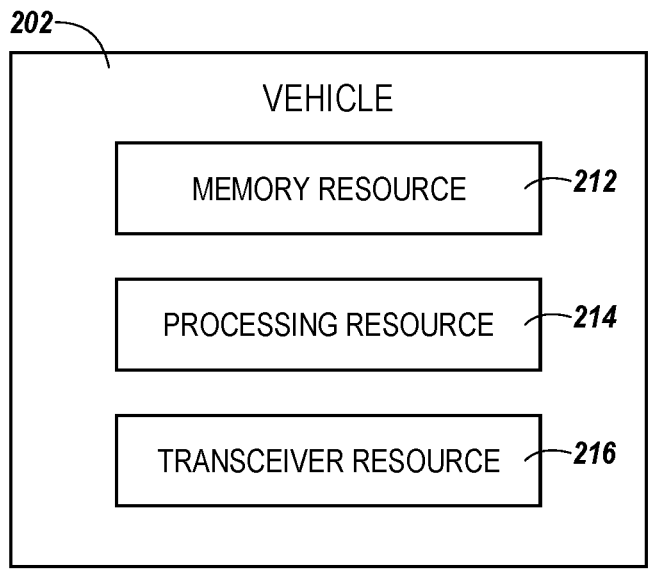
FIG. 2 is a block diagram of an example vehicle in accordance with an embodiment of the present disclosure.

FIG. 2 is a block diagram of an example vehicle 202 in accordance with an embodiment of the present disclosure. The vehicle 202 can be an autonomous vehicle or a non-autonomous vehicle. The vehicle 202 can be a service vehicle, a fleet vehicle, an emergency vehicle, etc. The vehicle 202 can be, for example, a car, a truck, a bus, or an ambulance, though it is noted that embodiments of the present disclosure are not so limited. The vehicle 102 can include a memory resource 212, a processing resource 214, and a transceiver resource 216, as illustrated in FIG. 2. The memory resource 212 (which can be also referred to as "memory) may include memory (e.g., memory cells) arranged, for example, in a number of bank groups, banks, bank sections, subarrays, and/or rows of a number of memory devices. In some embodiments, the memory resource 212 may include a plurality of memory devices such as a number of volatile memory devices formed and/or operable as RAM, DRAM, SRAM, SDRAM, and/or TRAM, among other types of volatile memory devices. In some embodiments, the memory resource 212 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices. In some embodiments, the memory resource 212 may include a combination of a number of volatile memory devices and a number of non-volatile memory device, as described herein.

Although not shown in FIG. 2, the memory resource 212 can be coupled to and/or include a controller that can send commands to perform operations on the memory resource 212, including operations to sense (e.g., read), program (e.g., write), move, and/or erase data.

The processing resource 214 can be coupled to the memory resource 212 and to the transceiver resource 216, and configured to access data stored in the memory resource 212 and/or data stored in a control node (e.g., control node 408), network (e.g., network 406), and/or a traffic control device (e.g., traffic control device 304) via a transceiver (e.g., transceiver resource 216).

As used herein, a "transceiver" may be referred to as a device including both a transmitter and a receiver. In an embodiment, the transceiver may be and/or include a number of radio frequency (RF) transceivers. The transmitter and receiver may, in a number of embodiments, be combined and/or share common circuitry. In an embodiment, no circuitry may be common between the transmit and receive functions and the device may be termed as a transmitter-receiver. Other devices consistent with the present disclosure may include transponders, transverters, and/or repeaters, among similar devices. As used herein, the terms "transceiver resource" and "transceiver" are used interchangeably herein and can have the same meaning, as appropriate to the context.

Various wireless communication technologies can be utilized in communicating with different entities (e.g., vehicle 202, traffic control device 304, and/or control node 408) via the transceiver resource 216. For example, different generations of broadband mobile telecommunication technologies (e.g., first through fifth generation (1-5G)), device-to-device to communication including Bluetooth, Zigbee, 1-5G and/or long-term evolution (LTE) device-to-device communication technologies, and/or other wireless communication utilizing an intermediary device (e.g., WiFi utilizing an access point AP) may be utilized in communicating with different entities.

In some embodiments, the vehicle 202 can access a traffic control device (e.g., traffic control device 304) to wirelessly utilize the data stored in the traffic control device. As an example, the vehicle 202 can access data stored in the traffic control device to access a network (e.g., network 406) of traffic control devices.

Figure 3:
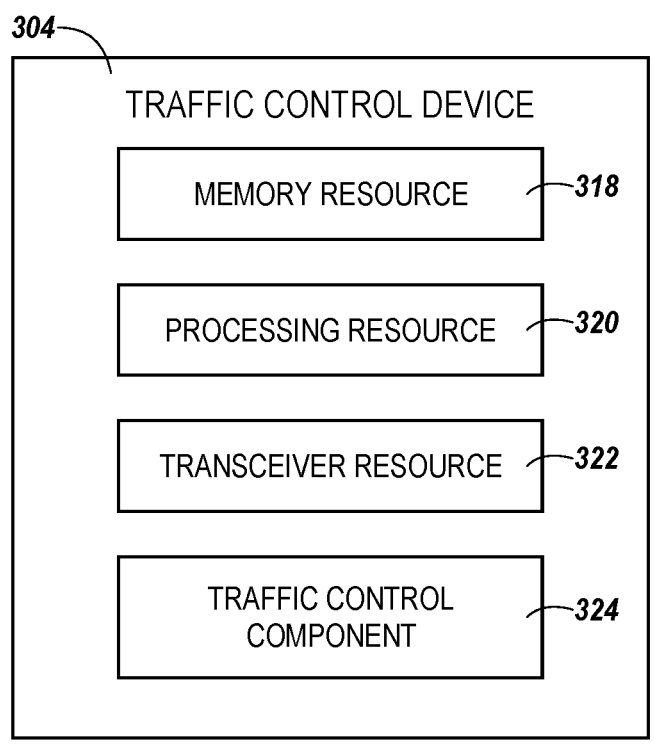
FIG. 3 is a block diagram of an example traffic control device in accordance with an embodiment of the present disclosure.

FIG. 3 is a block diagram of an example traffic control device 304 in accordance with an embodiment of the present disclosure. As previously discussed, the traffic control device 304 is a device configured to inform, guide, and/or control traffic. The traffic control device 304 can include a memory resource 318, a processing resource 320, and a transceiver resource 322, as illustrated in FIG. 3. The memory resource 318 (which can be also referred to as "memory) may include memory (e.g., memory cells) arranged, for example, in a number of bank groups, banks, bank sections, subarrays, and/or rows of a number of memory devices. In some embodiments, the memory resource 318 may include a plurality of memory devices such as a number of volatile memory devices formed and/or operable as RAM, DRAM, SRAM, SDRAM, and/or TRAM, among other types of volatile memory devices. In some embodiments, the memory resource 318 may include a number of non-volatile memory devices formed and/or operable as PCRAM, RRAM, FeRAM, MRAM, and/or STT RAM, phase change memory, 3DXPoint, and/or Flash memory devices, among other types of non-volatile memory devices. In some embodiments, the memory resource 318 may include a combination of a number of volatile memory devices and a number of non-volatile memory device, as described herein.

Although not shown in FIG. 3, the memory resource 318 can be coupled to and/or include a controller that can send commands to perform operations on the memory resource 318, including operations to sense (e.g., read), program (e.g., write), move, and/or erase data.

The memory resource 318 can store data corresponding to various types of information such as vehicle information. As used herein, vehicle information can refer to information that can identify and authenticate a particular vehicle (e.g., vehicle 202) in a network. For example, vehicle information can include a vehicle identification number (VIN), Unified Diagnostic Services (UDS) key, a road identification indicating which road and/or which location along that road the vehicle is on or located.

The processing resource 320 can be coupled to the memory resource 318 and to the transceiver resource 322 and configured to receive data from different entities such as a vehicle (e.g., vehicle 202) and/or a control node (e.g., control node 408) via the transceiver resource 322.

Various wireless communication technologies can be utilized in communicating with different entities (e.g., vehicle 202) via the transceiver resource 322. For example, different generations of broadband mobile telecommunication technologies (e.g., 1-5G), device-to-device to communication including Bluetooth, Zigbee, 1-5G and/or LTE device-to-device communication technologies, and/or other wireless communication utilizing an intermediary device (e.g., WiFi utilizing an access point AP) may be utilized in communicating with different entities.

In some embodiments, as described further below, the traffic control device 304 can verify a vehicle, provide a particular key that the vehicle can utilize to encrypt data, and decrypt the data received from the vehicle using another key that was generated along with the particular key.

The traffic control device 304 can include a traffic control component 324. The traffic control component 324 can include one or more displays, light elements, audio elements, and/or mechanical components, for instance, configured to inform, guide, and/or control traffic.

In some embodiments, the traffic control device 304 can be used to collect emergency, notification, and/or vehicle data, such as a status of an approaching emergency vehicle, vehicle identification data, etc. For example, a current emergency vehicle status (e.g., location, speed, type of emergency addressed by vehicle, route, destination), an identity of the emergency vehicle, and/or a date and time can be transmitted from the vehicle 202 to the traffic control device 304.

The traffic control device 304 may also communicate with an emergency operations center, such as a hospital, a fire station, a police station, a dispatch center, etc. For example, traffic control device 304 can be wirelessly coupled or hardwired to the emergency operations center. In some examples, traffic control communications component 346 can communicate with the emergency operations center via WIFI or over the Internet. In some embodiments, the emergency operations center can be a control node of a network (e.g., control node 408 of network 406) and the traffic control device 304 can be a node of the network. The emergency operations center (e.g., the control node 408) can include a memory resource, a processing resource, and a transceiver resource in a manner analogous to that of the traffic control device 304, for instance.

Figure 4:
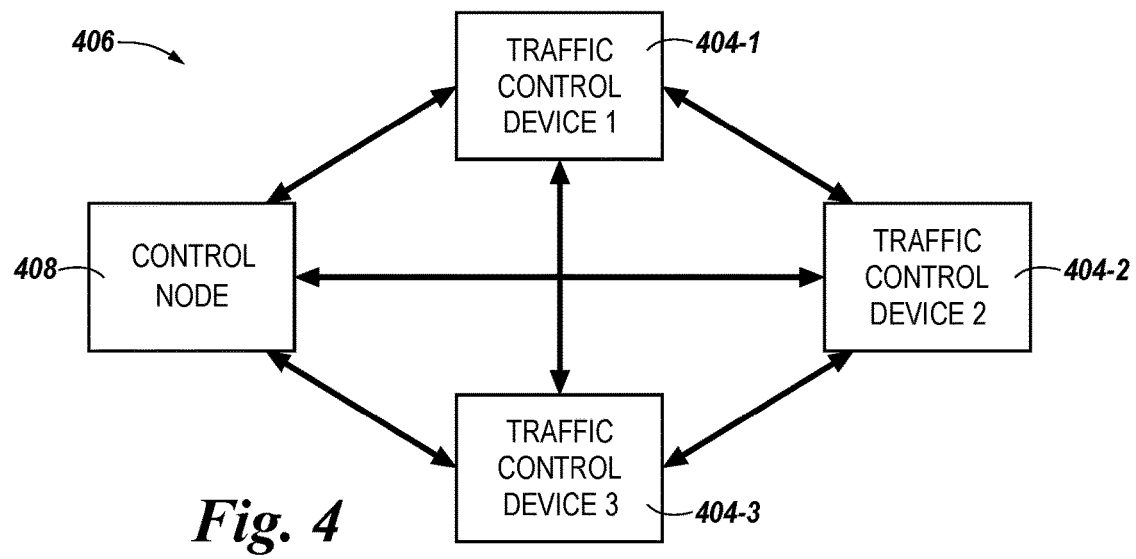
FIG. 4 is a block diagram of an example system, including a plurality of traffic control devices and a control node, in accordance with an embodiment of the present disclosure.

FIG. 4 is a block diagram of an example system, including a plurality of traffic control devices and a control node, in accordance with an embodiment of the present disclosure. As illustrated in FIG. 4, a system can include a plurality of traffic control devices 404-1 (traffic control device 1), 404-2 (traffic control device 2), 404-3 (traffic control device 3) (cumulatively referred to as "traffic control devices 404"). It is noted that while three traffic control devices are shown in FIG. 4, embodiments of the present disclosure do not limit systems to a particular quantity of traffic control devices. As discussed below in connection with FIG. 5, the traffic control devices 404 can be associated with a particular area, in some embodiments.

Each of the traffic control devices 404 can operate as a node of a peer-to-peer network 406 to host a decentralized, distributed database (e.g., implemented using a block chain technique). Accordingly, the present disclosure makes alternate reference to both "traffic control devices 404" and "nodes 404." The decentralized, distributed database can be configured to store redundant copies of activity records related to traffic, such as vehicles registered to the network 406, emergency vehicles registered to the network 406, etc. For example, each respective traffic control device 404 can broadcast a traffic record in the peer to peer network 406 to cause one or more additional nodes 404 in the peer to peer network 406 to store the traffic activity record in the decentralized, distributed database having a copy of the traffic activity record maintained by each of the one or more additional nodes 404. The traffic control devices 404 can control traffic based, at least in part, on network consensus on the activity records stored in the decentralized, distributed database. For example, each node 404 in the network 406 can independently determine the validity of a record based on copies of records stored in the node 404. In some embodiments, when a majority of active nodes 404 in the network 406 approves the validity of a record, the network 406 can reach network consensus that the activity record is valid; and the validated activity record can be used to control the operations of the traffic control devices 404.

A control node 408 can be configured to monitor traffic conditions within the area, determine the presence of vehicles in the area, and/or control the overall traffic flow through the area via the traffic control devices 404. In some embodiments, the control node 408 can be associated with (e.g., located at) an emergency operations center, such as a hospital, a fire station, a police station, a dispatch center, etc. The control node 408 can be configured as the "owner" of the block chain, apprising the control node 408 of a status of the block, and allowing the control node 408 to create a backup of the network 406 and/or reconfigure the network 406. In some embodiments, the control node 408 maintains a record of vehicles that are registered to the block chain and/or the network 406. The control node 408 can be a distributed and/or local artificial intelligence in communication with the traffic control devices 404.

Figure 5:
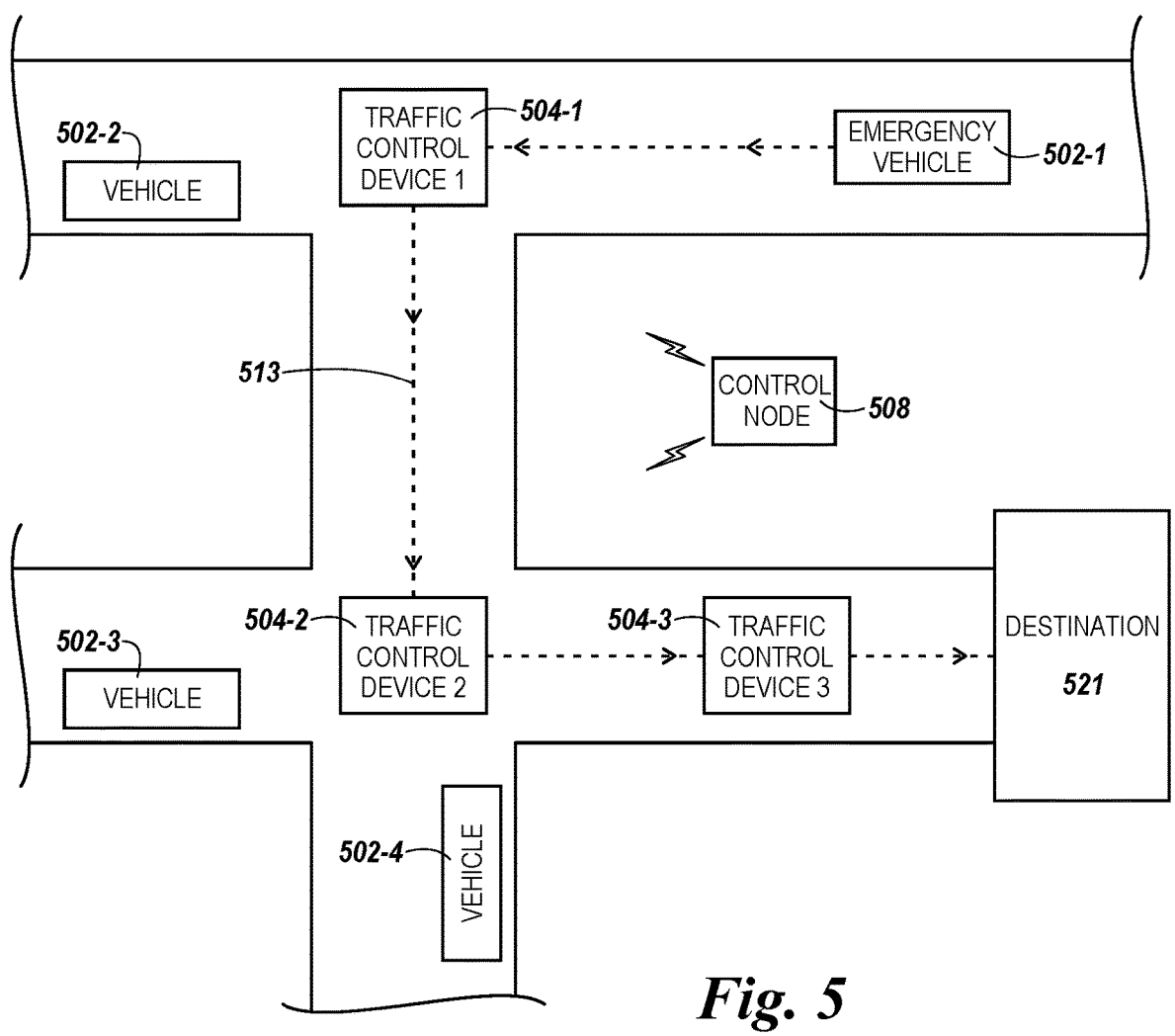
FIG. 5 illustrates a diagram of an example area, including traffic control devices, vehicles, and emergency vehicles, in accordance with an embodiment of the present disclosure.

FIG. 5 illustrates a diagram of an example area, including traffic control devices, vehicles, and emergency vehicles in accordance with an embodiment of the present disclosure. As illustrated in FIG. 5, an area can include a plurality of traffic control devices 504-1 (traffic control device 1), 504-2 (traffic control device 2), 504-3 (traffic control device 3) (cumulatively referred to as "traffic control devices 504"). It is noted that while three traffic control devices are shown in the area illustrated in FIG. 5, embodiments of the present disclosure do not limit a quantity of traffic control devices in an area.

As previously discussed, each of the traffic control devices 504 can operate as a node of a peer-to-peer network to host a decentralized, distributed database (e.g., implemented using a block chain technique). As previously discussed, a control node 508 can be configured to monitor traffic conditions within the area, determine the presence of an emergency vehicle 502-1 in the area, control the overall traffic flow through the area via the traffic control devices 504.

In some embodiments, the control node 508 can determine that the emergency vehicle 502-1 (e.g., an ambulance) is traveling through the area under emergency conditions. An indication of a destination 521 (e.g., a hospital) can be communicated from the emergency vehicle 502-1 to the control node 508. In some embodiments, the destination 521 can be determined by the control node 508 and an indication communicated to the emergency vehicle 502-1. The control node 508 can determine a route 513 leading from a current location of the emergency vehicle 502-1 to the destination 521. In some embodiments, the control node 508 can determine the route 513 leading from a current location of the emergency vehicle 502-1 to the destination 521 using a routing algorithm. As illustrated in the example shown in FIG. 5, the route 513 passes through a portion of the area controlled by traffic control device 1 504-1, then through a portion of the area controlled by traffic control device 2 504-2, then through a portion of the area controlled by traffic control device 3 504-3.

The control node 508 can exchange secure data with traffic control devices 504 to modify the operations of the traffic control devices 504 to allow expedient travel by the emergency vehicle 502-1 along the route 513 to the destination 521. Stated differently, embodiments herein can modify the operations of the traffic control devices 504 to give travel priority to the emergency vehicle 502-1 along the route 513. The exchange of the secure data with the traffic control devices 504 to modify the operations of the traffic control devices 504 can be made using block chain encryption techniques described herein (e.g., in connection with FIGS. 6-11). In some embodiments, each of the traffic control devices 504 can be modified to activate green lights for traffic (e.g., the emergency vehicle 502-1) traveling along the determined route 513. A respective green light can be activated for each of the traffic control devices 504 along the route 513.

It is noted that FIG. 5 illustrates traffic control devices 504 that are associated with the determined route 513 and does not illustrate traffic control devices that are not associated with the determined route 513. In some embodiments, traffic control devices not directly associated with the determined route 513 may continue to function normally (e.g., according to default and/or non-emergency operating parameters).

According to the modified operation of traffic control device 1 504-1, the vehicle 502-2 is prevented from entering the portion of the area (e.g., the intersection) controlled by traffic control device 1 504-1, and the vehicles 502-3 and 502-4 are prevented from entering the portion of the area controlled by traffic control device 2 504-2.

In some embodiments, the determined route 513 can be determined based on distance using a routing algorithm. For instance, the determined route 513 can be a shortest distance between the emergency vehicle 502-1 and the destination 521. In some embodiments, the determined route 513 can be determined based on travel time (e.g., expected and/or estimated travel time) using a routing algorithm. For instance, the determined route 513 can be a route determined based on lowest travel time to the destination 521. In some embodiments, the determined route 513 can be determined irrespective of traffic conditions. In some embodiments, the determined route can be determined based on current, predicted, and/or historical traffic conditions within the area.

In some embodiments, once the emergency vehicle 502-1 has traversed the portion of the area controlled by traffic control device 1 504-1, the traffic control device 504-1 can resume its normal (e.g., non-emergency) operation, once the emergency vehicle 502-1 has traversed the portion of the area controlled by traffic control device 2 504-2, the traffic control device 504-2 can resume its normal operation, and once the emergency vehicle 502-1 has traversed the portion of the area controlled by traffic control device 3 504-3, the traffic control device 504-3 can resume its normal operation.

The emergency vehicle 502-1 can be registered with the block chain and/or the network of nodes (e.g., the traffic control devices 504-3 and the control node 508). In some embodiments, the emergency vehicle 502-1 can be permanently registered. In some embodiments, a status of the emergency vehicle 502-1 can be determined and/or set by the control node 508. For instance, a vehicle normally not designated as an "emergency vehicle" can be temporarily promoted to the status of the emergency vehicle 502-1.

Figure 6:
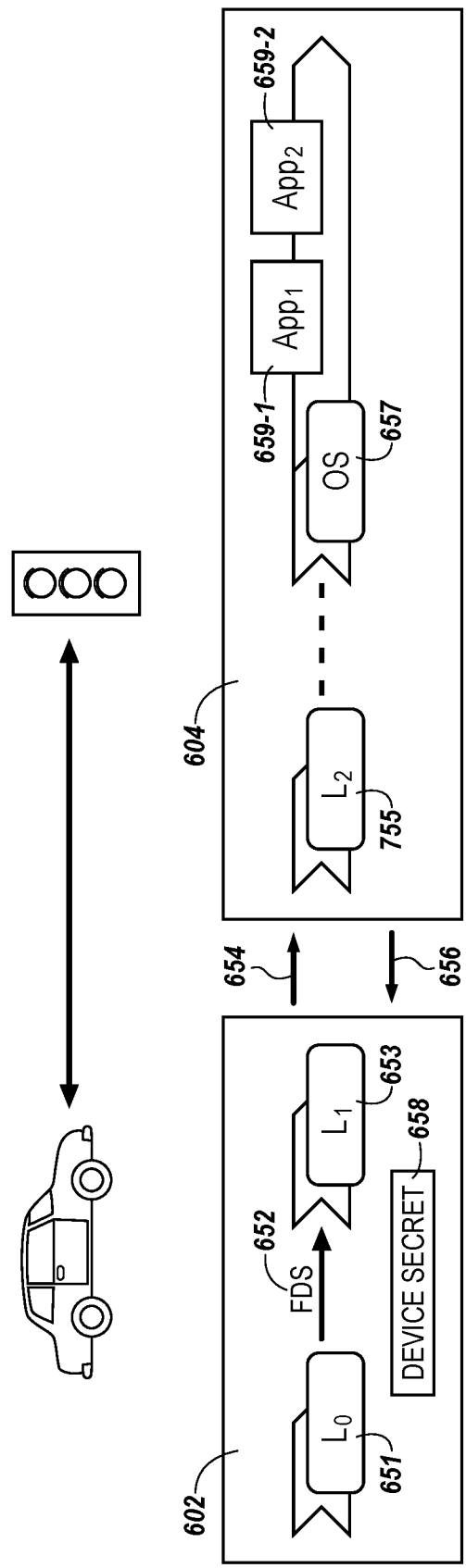
FIG. 6 is a block diagram of an example system including a vehicle and a traffic control device in accordance with an embodiment of the present disclosure.

FIG. 6 is a block diagram of an example system including a vehicle 602 and a traffic control device 604 in accordance with an embodiment of the present disclosure. A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 6, Layer 0 ("L$_0$") 651 and Layer 1 ("L$_1$") 653 are within the vehicle 602. Layer 0 651 can provide a Firmware Derivative Secret (FDS) key 652 to Layer 1 653. The FDS key 652 can describe the identity of code of Layer 1 653 and other security relevant data. In an example, a particular protocol (such as robust internet of things (RIOT) core protocol) can use the FDS 652 to validate code of Layer 1 653 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device.

A device secret 658 can be used to create the FDS 652 and be stored in memory of the vehicle 602. In some embodiments, the device secret 658 can be received from a control node (e.g., control node 408) of a network to which the vehicle 602 is registered. In an example operation, the vehicle 602 can read the device secret 658, hash an identity of Layer 1 653, and perform a calculation including:

$K_{L1}=KDF[Fs(s),\text{Hash}(\text{"immutable information"})]$ where K$_{L1}$ is a vehicle public key, KDF (e.g., KDF defined in the National Institute of Standards and Technology (NIST) Special Publication 800-108) is a key derivation function (i.e., HMAC-SHA256), and Fs(s) is the device secret 658. FDS 652 can be determined by performing:

$FDS=\text{HMAC-SHA256}[Fs(s),\text{SHA256}(\text{"immutable information"})]$

The vehicle 602 can transmit data, as illustrated by arrow 654, to the traffic control device 604. As an example, prior to the vehicle 602 being verified by the traffic control device 604, the transmitted data can include a vehicle identification that is public, a certificate (e.g., a vehicle certificate), and/or a vehicle public key. As an example, subsequent to the vehicle 602 being verified by the traffic control device 604, the transmitted data can include data to be stored in the traffic control device 604, such as data corresponding to vehicle information (e.g., as described in connection with FIG. 3).

Layer 2 ("L$_2$") 655 of the traffic control device 604 can receive the transmitted data and execute the data in operations of the operating system ("OS") 657 and on a first application 659-1 and a second application 659-2. The traffic control device 604 can also transmit data, as illustrated by arrow 656, to the vehicle 602. Data sent by the traffic control device 604 can include current operational state (e.g., normal mode, emergency mode) and/or current traffic control settings (e.g., green light, red light, yellow light, etc.), for instance. In some embodiments, data to be stored in the traffic control device 604 (e.g., vehicle route information) may also be received simultaneously along with the vehicle public identification, vehicle identification certificate, and/or vehicle public key that are received for verifying the vehicle 602. In this example, the data may be allowed to be stored in the traffic control device 604 when the vehicle 602 is verified, while the data may be discarded when the vehicle 602 is not verified by the traffic control device 604. Further details of verifying a vehicle or device (e.g., vehicle 602 and/or traffic control device 604) is described in connection with FIG. 8.

Figure 7:
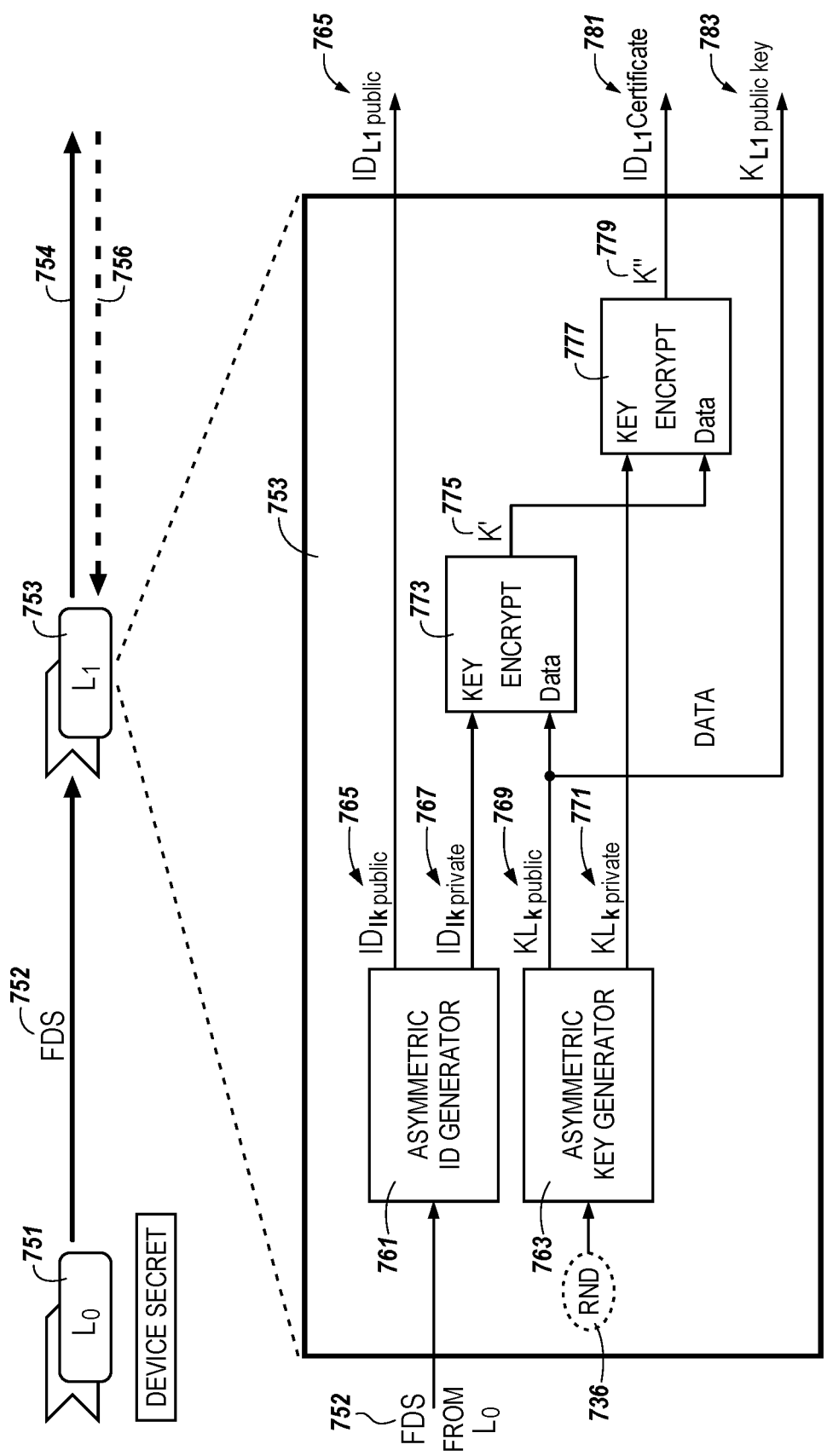
FIG. 7 is a block diagram of an example process to determine a number of parameters in accordance with an embodiment of the present disclosure.

FIG. 7 is a block diagram of an example process to determine a number of parameters in accordance with an embodiment of the present disclosure. FIG. 7 is an example of a determination of the parameters including a public identification (e.g., 765), a certificate (e.g., 781), and a public key (e.g., 783) that are then sent, indicated by arrow 754, to Layer 2 (e.g., Layer 2 655) of a traffic control device (e.g., 604 in FIG. 6). As used herein, a public identification, a certificate, and a public key that are generated from the vehicle 602 can be referred to as a vehicle public identification, a vehicle certificate, and a vehicle public key, respectively. Layer 0 ("$L_0$") 751 in FIG. 7 corresponds to Layer 0 651 in FIG. 6 and likewise FDS 752 corresponds to FDS 652, Layer 1 753 corresponds to Layer 1 653, and arrows 754 and 756 correspond to arrows 654 and 656, respectively.

The FDS 752 from Layer 0 751 is sent to Layer 1 753 and used by an asymmetric ID generator 761 to generate a public identification ("$ID_{lk\ public}$") 765 and a private identification 767. In the abbreviated "$ID_{lk\ public}$," the "lk" indicates Layer k (in this example Layer 1), and the "public" indicates that the identification is openly shared. The public identification 765 is illustrated as shared by the arrow extending to the right and outside of Layer 1 753 of a vehicle (e.g., vehicle 602). The generated private identification 767 is used as a key input into an encryptor 773. The encryptor 773 can be any processor, computing device, etc. used to encrypt data.

Layer 1 753 of a vehicle can include an asymmetric key generator 763. In at least one example, a random number generator (RND) 736 can optionally input a random number into the asymmetric key generator 763. The asymmetric key generator 763 can generate a vehicle public key ("$K_{Lk\ public}$") 769 and a vehicle private key ("$K_{LK\ private}$") 771 associated with a vehicle such as vehicle 602 in FIG. 6. The vehicle public key 769 can be an input (as "data") into the encryptor 773. The encryptor 773 can generate a result K' 775 using the inputs of the vehicle private identification 767 and the vehicle public key 769. The vehicle private key 771 and the result K' 775 can be input into an additional encryptor 777, resulting in output K" 779. The output K" 779 is the certificate ("$ID_{L1}$ certificate") 781 transmitted to the Layer 2 (655 of FIG. 6). The vehicle certificate 781 can provide an ability to verify and/or authenticate an origin of data sent from a device (e.g., a vehicle). As an example, data sent from the vehicle can be associated with an identity of the vehicle by verifying the certificate, as will be described further in association with FIG. 8. Further, the vehicle public key ("$K_{L1\ public\ key}$") 783 can be transmitted to Layer 2. Therefore, the public identification 765, the certificate 781, and the public key 783 of a vehicle can be transmitted to Layer 2 of a traffic control device.

Figure 8:
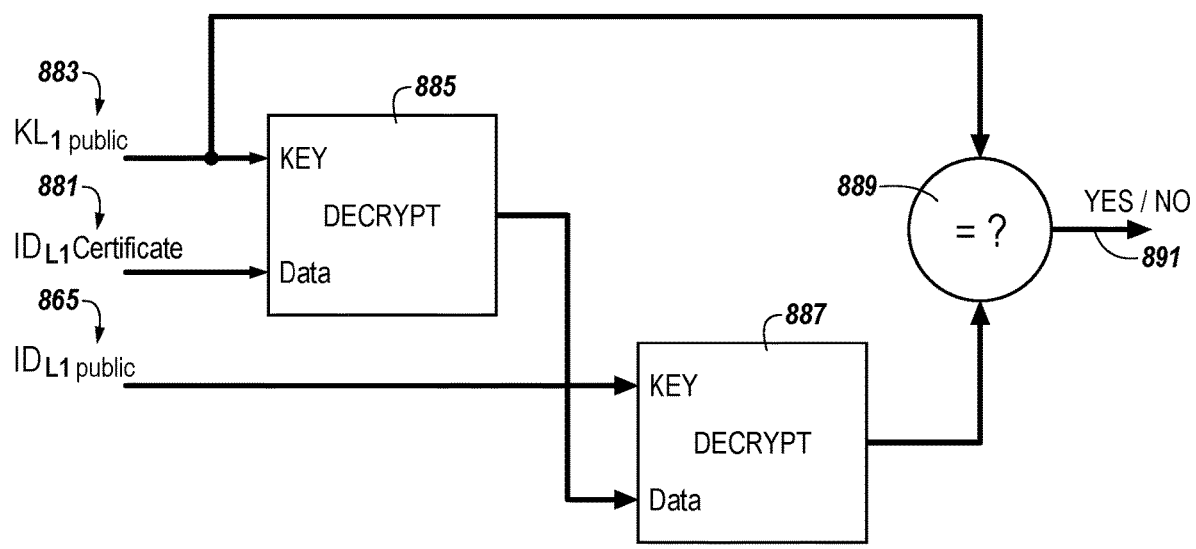
FIG. 8 is a block diagram of an example process to verify a certificate in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification 885 is provided from a vehicle (e.g., from Layer 1 653 of vehicle 602 in FIG. 6). The data of the certificate 881 and the public key 883 can be used as inputs into a decryptor 885. The decryptor 885 can be any processor, computing device, etc used to decrypt data. The result of the decryption of the certificate 881 and the public key 883 can be used as an input into a secondary decryptor 887 along with the public identification, result in an output. The public key 883 and the output from the decryptor 887 can indicate, as illustrated at 889, whether the certificate 881 is verified, resulting in a yes or no 891 as an output.

In response to the certificate 881 being verified, data may be further exchanged between the vehicle and the traffic control device. In one example, in response to the vehicle being verified, a public key, a certificate, and a public identification generated at the traffic control device can be provided back to the vehicle. In another example, in response to the vehicle being verified, the vehicle can further provide data to be stored in the traffic control device and the data can be accepted, decrypted, and processed. However, in response to the certificate not being verified, data received from the device being verified can be discarded, removed, and/or ignored and/or further data exchanged between two can be prohibited. In this way, nefarious devices and/or vehicles sending nefarious data can be detected and avoided. As an example, a hacker sending data to be processed can be identified and the hacking data not processed. Further details of data exchange subsequent to a verification is described in connection with FIG. 9.

Figure 9:
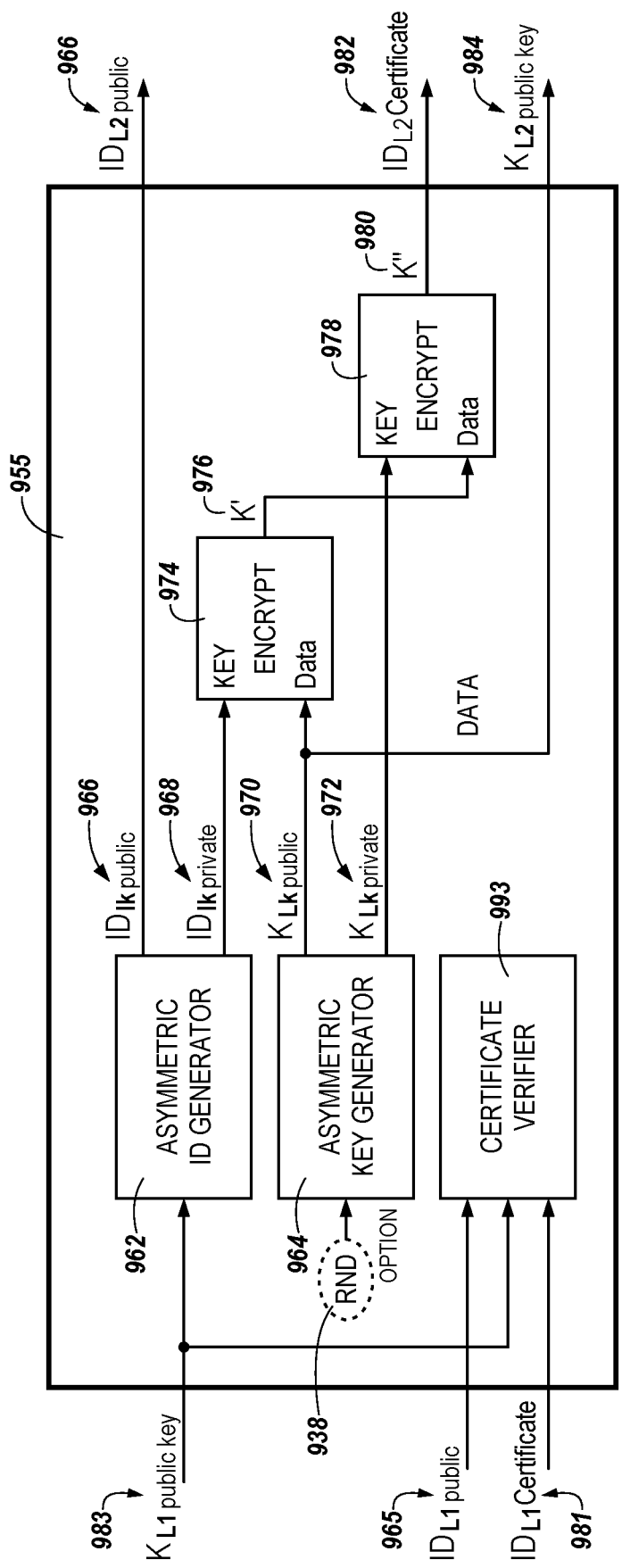
FIG. 9 is a block diagram of an example process to determine a number of parameters in accordance with an embodiment of the present disclosure.

FIG. 9 is a block diagram of an example process to determine a number of parameters in accordance with an embodiment of the present disclosure. FIG. 9 illustrates a Layer 2 955 of a traffic control device (e.g., traffic control device 604 in FIG. 6) generating an identification ("$ID_{L2}$ public") 966, a certificate ("$ID_{L2}$ Certificate") 982, and a public key ("$K_{L2\ public\ key}$") 984. As used herein, a public identification, a certificate, and a public key that are generated at the traffic control device (e.g., traffic control device 604) can be referred to as a traffic control public identification, a traffic control certificate, and a traffic control public key, respectively.

The vehicle public key ("$K_{L1\ public\ key}$") 983 transmitted from Layer 1 of the vehicle to Layer 2 955 of a traffic control device, as described in FIG. 7, is used by an asymmetric ID generator 962 of the traffic control device to generate a public identification ("$ID_{lk\ public}$") 966 and a private identification 968 of the traffic control device. In the abbreviated "$ID_{lk\ public}$," the "lk" indicates Layer k (in this example Layer 2), and the "public" indicates that the identification is openly shared. The public identification 966 is illustrated as shared by the arrow extending to the right and outside Layer 2 955. The generated private identification 968 is used as a key input into an encryptor 974.

As shown in FIG. 9, the vehicle certificate 981 and vehicle identification 965, along with the vehicle public key 983, are used by a certificate verifier 993. The certificate verifier 993 can verify the vehicle certificate 981 received from the vehicle, and determine, in response to the vehicle certificate 981 being verified or not being verified, whether to accept or discard data received from the vehicle. Further details of verifying the vehicle certificate 981 is described in connection with FIG. 10.

Layer 2 955 of the traffic control device can include an asymmetric key generator 964. In at least one example, a random number generator (RNID) 938 can optionally input a random number into the asymmetric key generator 964. The asymmetric key generator 964 can generate a public key ("$K_{Lk\ public}$") 970 and a private key ("$K_{LK\ private}$") 972 associated with a traffic control device such as traffic control device 606 in FIG. 6. The traffic control public key 970 can be an input (as "data") into the encryptor 974. The encryptor 974 can generate a result K' 976 using the inputs of the traffic control private identification 968 and the traffic control public key 970. The traffic control private key 972 and the result K' 976 can be input into an additional encryptor 978, resulting in output K" 980. The output K" 980 is the traffic control certificate ("$ID_{L2}$ certificate") 982 transmitted back to the Layer 1 (653 of FIG. 6). The traffic control certificate 982 can provide an ability to verify and/or authenticate an origin of data sent from a device. As an example, data sent from the traffic control device can be associated with an identity of the traffic control device by verifying the certificate. Further, the traffic control public key ("$K_{L2\ public\ key}$") 984 can be transmitted to Layer 1. Therefore, the public identification 966, the certificate 982, and the public key 984 of the traffic control device can be transmitted to Layer 1 of a vehicle.

In an example, in response to a vehicle receiving a public key from a traffic control device, the vehicle can encrypt data to be sent to the traffic control device using the traffic control public key. Vice versa, the traffic control device can encrypt data to be sent to the vehicle using the vehicle public key. In response to the traffic control device receiving data encrypted using the traffic control public key, the traffic control device can decrypt the data using its own private key (e.g., traffic control private key). Likewise, in response to the vehicle receiving data encrypted using the vehicle public key, the vehicle can decrypt the data using its own private key (e.g., vehicle private key). As the traffic control private key is not shared with another device outside the traffic control device and the vehicle private key is not shared with another device outside the vehicle, the data sent to the traffic control device and the vehicle remains secure.

In an embodiment, a first entity that initially requests a handshake with a second entity may generate a first public key, a first public identification, and a first certificate based on a device secret of its own. On the other hand, the second entity that received a request to handshake may generate a second public key, a second public identification, and a second certificate based on the first public key provided by the first entity. For example, the embodiment illustrated in FIGS. 6, 7, and 9 illustrates a vehicle (e.g., vehicle 602) as an entity initially requesting a handshake with a traffic control device (e.g., traffic control device 604). In this embodiment, the vehicle generates a public key (e.g., public key 783), public identification (e.g., public identification 765), and a certificate (e.g., certificate 781) based on a device secret of the vehicle (e.g., provided from a control node and/or emergency operations center), and the traffic control device generates those based on the public key provided from the vehicle. However, embodiments are not so limited. For example, the traffic control device may initially request a handshake with the vehicle such that the traffic control device generates a public key, public identification, and a certificate using its own device secret, while the vehicle generates those based on the public key provided from the traffic control device.

Figure 10:
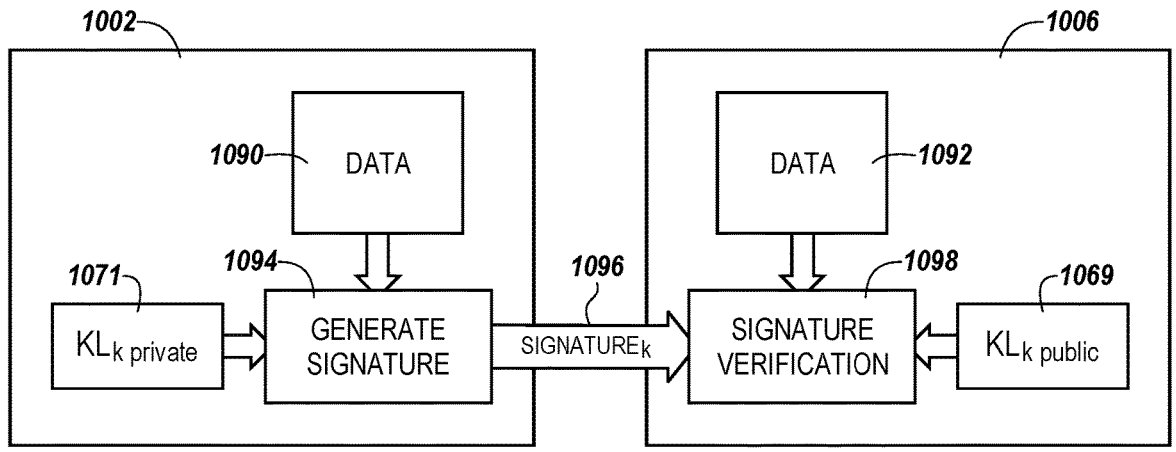
FIG. 10 is a block diagram of an example process to verify a signature in accordance with an embodiment of the present disclosure.

FIG. 10 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicle 1002 (such as vehicle 202 in FIG. 2) can send data 1090 to a traffic control device 1004 (such as traffic control device 304 in FIG. 3). The vehicle 1002 can generate, at 1094, a signature 1096 using a device private key 1071. The signature 1096 can be transmitted to the traffic control device 1004. The traffic control device 1004 can verify, at 1098, the signature using data 1092 and the vehicle public key 1069 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 11:
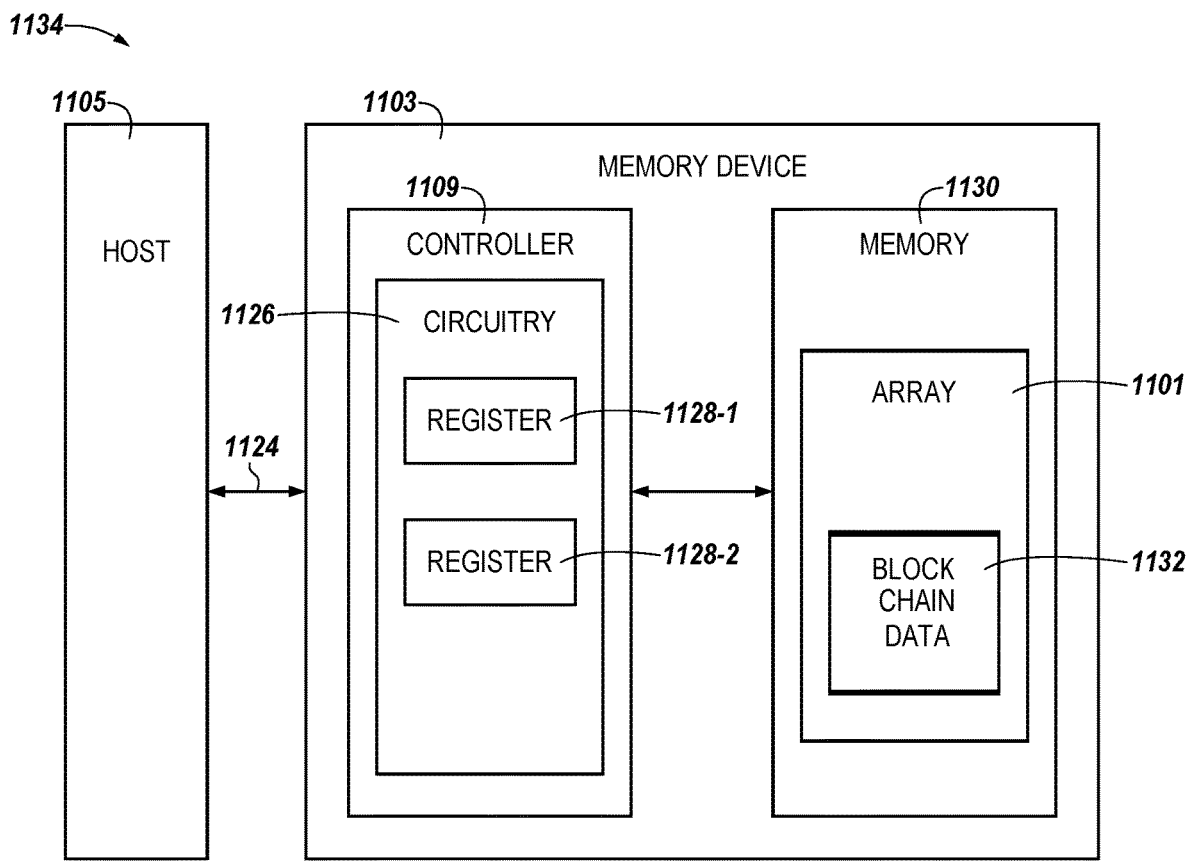
FIG. 11 is a block diagram of a computing system including a host and an apparatus in the form of a memory device in accordance with an embodiment of the present disclosure.

FIG. 11 is a block diagram of a computing system 1134 including a host 1105 and an apparatus in the form of a memory device 1103 in accordance with an embodiment of the present disclosure. In an example, the host 1105 and the memory device 1103 can be a vehicle 202 and a traffic control device 304, as previously described in connection with FIGS. 2 and 3, respectively. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 1134 can include a number of memory devices analogous to memory device 1103.

In the embodiment illustrated in FIG. 11, memory device 1103 can include a memory 1130 having a memory array 1101. Memory array 1101 can be analogous to memory array 101 and/or memory resources 212 and/or 318 previously described in connection with FIGS. 1, 2, and 3, respectively. Although one memory array 1101 is illustrated in FIG. 11, memory 1130 can include any number of memory arrays analogous to memory array 1101. As shown in FIG. 11, memory 1130 can store "block chain data" 1132, used in block chain technology systems, in the memory array 1101. A "block" of block chain data in a block chain technology system can include data (e.g., payload), headers, encryption, history, timestamps, etc. It is noted that, as used herein a block of block chain data in a block chain architecture does not have to equate to the size of a block of memory as described previously in connection with FIG. 1. A block may be smaller, equivalent, and/or larger than a block size unit, e.g., denomination, associated with a particular memory architecture or design.

As illustrated in FIG. 11, host 1105 can be coupled to the memory device 1103 via interface 1124. Host 1105 and memory device 1103 can communicate (e.g., send commands and/or data such as block chain data 1132) on interface 1124. Host 1105 and/or memory device 1103 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

In some embodiments, interface 1124 can be in the form of a standardized physical interface. For example, when memory device 1103 is used for information storage in computing system 1134, interface 1124 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 1124 can provide an interface for passing control, address, information (e.g., data), and other signals between memory device 1103 and a host (e.g., host 1105) having compatible receptors for interface 1124.

In some embodiments, interface 1124 can be utilized for a wireless communication technology, such as different generations of broadband mobile telecommunication technologies (e.g., 1-5G), device-to-device to communication including Bluetooth, Zigbee, 1-5G and/or long-term evolution (LTE) device-to-device communication technologies, and/or other wireless communication utilizing an intermediary device (e.g., WiFi utilizing an access point AP) may be utilized in communicating with different entities, as described in connection with FIGS. 2 and 3.

Memory device 1103 includes controller 1109 to communicate with host 1105 and with memory 1130 (e.g., memory array 1101). For instance, controller 1109 can send commands to perform operations on memory array 1101, including operations to sense (e.g., read), program (e.g., write), move, and/or erase data, among other operations.

Controller 1109 can be included on the same physical device (e.g., the same die) as memory 1130. Alternatively, controller 1109 can be included on a separate physical device that is communicatively coupled to the physical device that includes memory 1130. In an embodiment, components of controller 1109 can be spread across multiple physical devices (e.g., some components on the same die as the memory, and some components on a different die, module, or board) as a distributed controller.

Host 1105 can include a host controller (not shown FIG. 11) to communicate with memory device 1103. The host controller can send commands to memory device 1103 via interface 1124. The host controller can communicate with memory device 1103 and/or the controller 1109 on the memory device 1103 to read, write, and/or erase data, among other operations. Further, in an embodiment, host 1105 can be an IoT enabled device, as previously described herein, having IoT communication capabilities.

Controller 1109 on memory device 1103 and/or the host controller on host 1105 can include control circuitry and/or logic (e.g., hardware and firmware). In an embodiment, controller 1109 on memory device 1103 and/or the host controller on host 1105 can be an application specific integrated circuit (ASIC) coupled to a printed circuit board including a physical interface. Also, memory device 1103 and/or host 1105 can include a buffer of volatile and/or non-volatile memory and a number of registers.

For example, as shown in FIG. 11, memory device 1103 can include circuitry 1126. In the embodiment illustrated in FIG. 11, circuitry 1126 is included in controller 1109. However, embodiments of the present disclosure are not so limited. For instance, in an embodiment, circuitry 1126 may be included in (e.g., on the same die as) memory 1130 (e.g., instead of in controller 1109). Circuitry 1126 can comprise, for instance, hardware, firmware, and/or software.

Circuitry 1126 can generate a block of block chain data 1132 for validating (e.g., authenticating and/or attesting) the data stored in memory 1130 (e.g., in memory array 1101). The block of the block chain data 1132 can include a cryptographic hash of (e.g., a link to) the previous block in the block chain, and a cryptographic hash of (e.g., identifying) the data stored in memory array 1101. The block of the block chain data 1132 can also include a header having a timestamp indicating when the block was generated. Further, the block of the block chain data 1132 can have a digital signature associated therewith that indicates the block is included in the block chain.

The cryptographic hash of the data stored in memory array 1101, and/or the cryptographic hash of the previous block in the block chain, can comprise, for instance, a SHA-256 cryptographic hash. Further, the cryptographic hash of the data stored in memory array 1101, and the cryptographic hash of the previous block in the block chain, can each respectively comprise 256 bytes of data.

The cryptographic hash of the data stored in memory array 1101 can be generated (e.g., calculated), for example, by circuitry 1126. In such an example, the cryptographic hash of the data stored can be internally generated by memory device 1103 without having external data moving on interface 1124. As an additional example, the cryptographic hash of the data can be communicated from an external entity. For instance, host 1105 can generate the cryptographic hash of the data stored in memory array 1101, and send the generated cryptographic hash to memory device 1103 (e.g., circuitry 1126 can receive the cryptographic hash of the data stored in memory array 1101 from host 1105).

The digital signature associated with the block of the block chain data 1132 can be generated (e.g., calculated), for example, by circuitry 1126 based on (e.g., responsive to) an external command, such as a command received from host 1105. For instance, the digital signature can be generated using symmetric or asymmetric cryptography. As an additional example, host 1105 can generate the digital signature, and send (e.g. provide) the generated digital signature to memory device 1103 (e.g., circuitry 1126 can receive the digital signature from host 1105).

As shown in FIG. 11, the block of the block chain data 1132, as well as the digital signature associated with the block of the block chain data 1132, can be stored in memory array 1101. For example, the block of the block chain data 1132 can be stored in a portion of memory array 1101 that is inaccessible to a user of memory device 1103 and/or host 1105 (e.g., in a "hidden" region of memory array 1101). Storing the block of the block chain data 1132 in memory array 1101 can simplify the storage of the block by, for example, removing the need for software storage management for the block.

In an embodiment, memory array 1101 (e.g., a subset of array 1101, or the whole array 1101) can be a secure array (e.g., an area of memory 1130 to be kept under control). For example, the data stored in memory array 1101 can include sensitive (e.g., non-user) data, such as host firmware and/or code to be executed for sensitive applications. In such an embodiment, a pair of non-volatile registers can be used to define the secure array. For example, in the embodiment illustrated in FIG. 11, circuitry 1126 includes registers 1128-1 and 1128-2 that can be used to define the secure array. For instance, register 1128-1 can define the address (e.g., the starting LBA of the data) of the secure array, and register 1128-2 can define the size (e.g., the ending LBA of the data) of the secure array. Once the secure array has been defined, circuitry 1126 can generate (e.g., calculate) a cryptographic hash associated with the secure array, which may be referred to herein as a golden hash, using authenticated and antireplay protected commands (e.g., so that only memory device 1103 knows the golden hash, and only memory device 1103 is capable of generating and updating it). The golden hash may be stored in inaccessible portion of memory array 1101 (e.g., the same inaccessible portion in which block of the block chain data 1132 is stored), and can be used during the process of validating the data of the secure array.

Memory device 1103 (e.g., circuitry 1126) can send, via interface 1124, the block of the block chain data 1132, along with the digital signature associated with block of the block chain data 1132, to host 1105 for validation of the data stored in memory array 1101. For example, circuitry 1126 can sense (e.g., read) the block of the block chain data 1132 stored in memory array 1101, and send the sensed block to host 1105 for validation of the data stored in array 1101, responsive to a powering (e.g., a powering on and/or powering up) of memory device 1103. As such, a validation of the data stored in memory array 1101 can be initiated (e.g., automatically) upon the powering of memory device 1103.

As an additional example, circuitry 1126 can send the block of the block chain data 1132, along with the digital signature associated with block of the block chain data 1132, to host 1105 upon an external entity, such as host 1105, initiating a validation of the data stored in memory array 1101. For instance, host 1105 can send a command to memory device 1103 (e.g., circuitry 1126) to sense the block of the block chain data 1132, and circuitry 1126 can execute the command to sense the block of the block chain data 1132, and send the sensed block to host 1105 for validation of the data stored in array 1101, responsive to receipt of the command.

Upon receiving the block of the block chain data 1132, host 1105 can validate (e.g., determine whether to validate) the data stored in memory array 1101 using the received block. For example, host 1105 can use the cryptographic hash of the previous block in the block chain and the cryptographic hash of the data stored in memory array 1101 to validate the data. Further, host 1105 can validate the digital signature associated with the block of the block chain data 1132 to determine the block is included (e.g., is eligible to be included) in the block chain. As used herein, validating the data stored in memory array 1101 can include, and/or refer to, authenticating and/or attesting that the data is genuine (e.g., is the same as originally programmed), and has not been altered by hacking activity or other unauthorized changes.

In embodiments in which memory array 1101 is a secure array, the golden hash previously described herein may also be used to validate the data stored in memory array 1101. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1105.

After the validation of the data stored in memory array 1101, circuitry 1126 can generate an additional (e.g., the next) block in the block chain for validating the data stored in memory array 1101, in a manner analogous to which the block of the block chain data 1132 was generated. For example, this additional block can include a cryptographic hash of block of the block chain data 1132, which has now become the previous block in the block chain, and a new cryptographic hash of the data stored in memory array 1101. Further, this additional block can include a header having a timestamp indicating when this block was generated, and can have a digital signature associated therewith that indicates this block is included in the block chain. Further, in embodiments in which memory array 1101 is a secure array, an additional (e.g., new) golden hash can be generated.

The additional block, as well as the digital signature associated with the additional block, and the additional golden hash, can be stored in memory array 1101. For example, the additional block can replace block of the block chain data 1132 (e.g., the previous block) in memory array 1101. The additional block, digital signature, and additional golden hash can then be used by host 1105 to validate the data stored in memory array 1101, in a manner analogous to that previously described herein for the block of the block chain data 1132. Additional blocks in the block chain can continue to be generated by circuitry 1126, and used by host 1105 to validate the data stored in memory array 1101, in such manner throughout the lifetime of memory device 1103.

The embodiment illustrated in FIG. 11 can include additional circuitry, logic, and/or components not illustrated so as not to obscure embodiments of the present disclosure. For example, memory device 1103 can include address circuitry to latch address signals provided over I/O connectors through I/O circuitry. Address signals can be received and decoded by a row decoder and a column decoder, to access memory array 1101. Further, memory device 1103 can include a main memory, such as, for instance, a DRAM or SDRAM, that is separate from and/or in addition to memory array 1101. An example further illustrating additional circuitry, logic, and/or components of memory device 1103 will be further described herein (e.g., in connection with FIG. 12).

Figure 12:
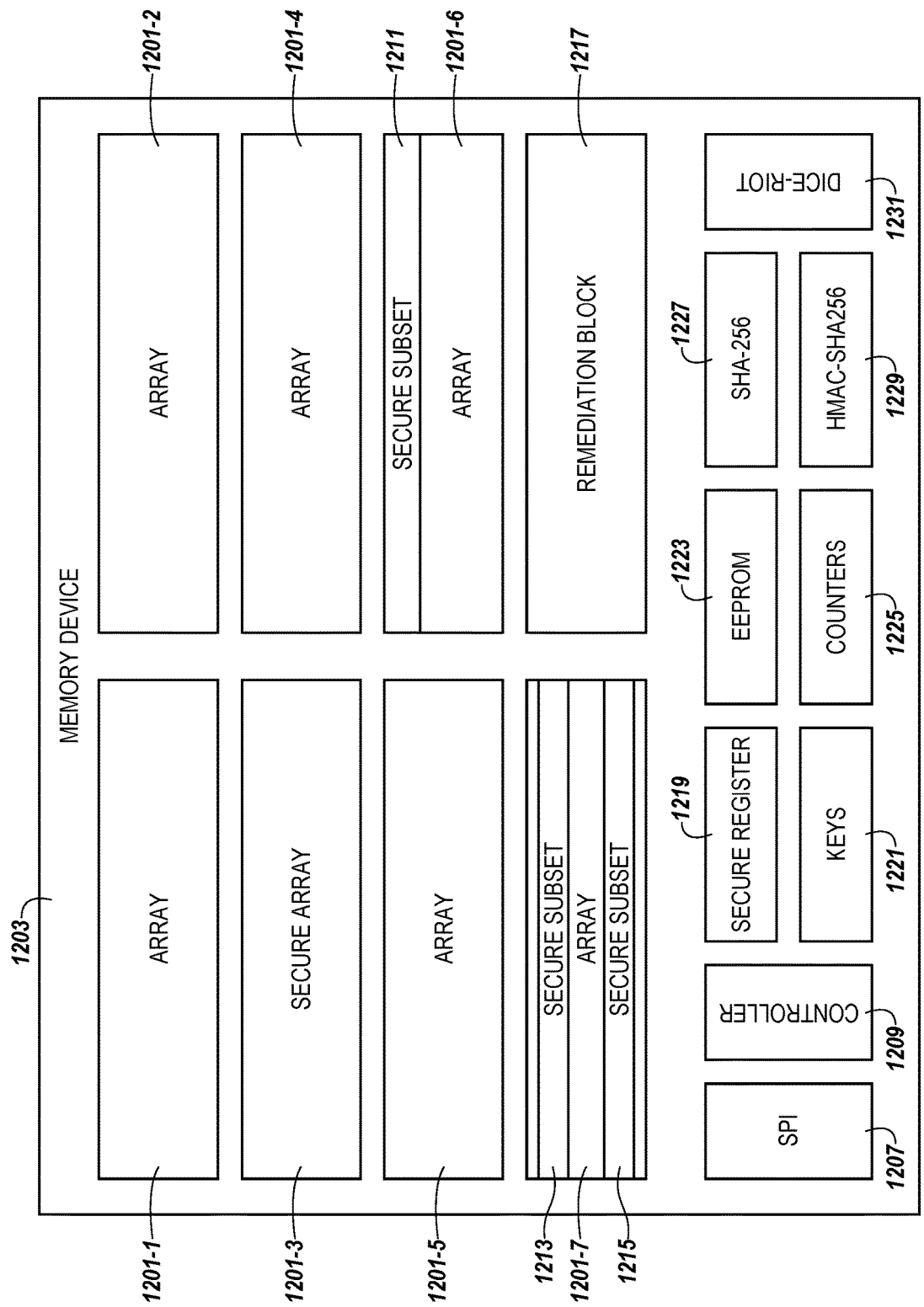
FIG. 12 is a block diagram of an example memory device in accordance with an embodiment of the present disclosure.

FIG. 12 is a block diagram of an example memory device 1203 in accordance with an embodiment of the present disclosure. Memory device 1203 can be, for example, a vehicle 202 or a traffic control device 304, as described in connection with FIGS. 2 and 3, respectively.

As shown in FIG. 12, memory device 1203 can include a number of memory arrays 1201-1 through 1201-7. Further, in the example illustrated in FIG. 12, memory array 1201-3 is a secure array, subset 1211 of memory array 1201-6 comprises a secure array, and subsets 1213 and 1215 of memory array 1201-7 comprise a secure array. Subsets 1211, 1213, and 1215 can each include, for instance, 4 kilobytes of data. However, embodiments of the present disclosure are not limited to a particular number or arrangement of memory arrays or secure arrays.

As shown in FIG. 12, memory device 1203 can include a remediation (e.g., recovery) block 1217. Remediation block 1217 can be used as a source of data in case of errors (e.g., mismatches) that may occur during operation of memory device 1203. Remediation block 1217 may be outside of the area of memory device 1203 that is addressable by a host.

As shown in FIG. 12, memory device 1203 can include a serial peripheral interface (SPI) 1207 and a controller 1209. Memory device 1203 can use SPI 1207 and controller 1209 to communicate with a host and memory arrays 1201-1 through 1201-7.

As shown in FIG. 12, memory device 1203 can include a secure register 1219 for managing the security of memory device 1203. For example, secure register 1219 can configure, and communicate externally, to an application controller. Further, secure register 1219 may be modifiable by an authentication command.

As shown in FIG. 12, memory device 1203 can include keys 1221. For instance, memory device 1203 can include eight different slots to store keys such as root keys, DICE-RIOT keys, and/or other external session keys.

As shown in FIG. 12, memory device 1203 can include an electronically erasable programmable read-only memory (EEPROM) 1223. EEPROM 1223 can provide a secure non-volatile area available for a host, in which individual bytes of data can be erased and programmed.

As shown in FIG. 12, memory device 1203 can include counters (e.g., monotonic counters) 1225. For instance, memory device 1203 can include six different monotonic counters, two of which may be used by memory device 1203 for authenticated commands, and four of which may be used by the host.

As shown in FIG. 12, memory device 1203 can include an SHA-256 cryptographic hash function 1227, and/or an HMAC-SHA256 cryptographic hash function 1229. SHA-256 and/or HMAC-SHA256 cryptographic hash functions 1227 and 1229 can be used by memory device 1203 to generate cryptographic hashes, such as, for instance, the cryptographic hash of a command as previously described herein, and/or a golden hash used to validate data stored in memory arrays 1201-1 through 1201-7. Further, memory device 1203 can support L0 and L1 of DICE-RIOT 1131.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
circuitry configured to:
receive a traffic control public key generated by a traffic control device associated with a road, wherein the traffic control public key is received in response to providing, to the traffic control device, a request to modify content of the traffic control device;
encrypt data corresponding to vehicle information using the traffic control public key;
provide, to the traffic control device, the encrypted data to store the data in the traffic control device; and
access a network of traffic control devices, including the traffic control device, via the data stored in the traffic control device.

2. The apparatus of claim 1, wherein the circuitry is configured to:
receive, from a control node of the network, a device secret along with the data corresponding to the vehicle information;
generate a vehicle public key based on the received device secret; and
provide, to the traffic control device, the vehicle public key, wherein an identity of the apparatus is verified based on the vehicle public key.

3. The apparatus of claim 2, wherein the traffic control public key is received from the traffic control device in response to the apparatus being verified based on the vehicle public key.

4. The apparatus of claim 1, wherein the vehicle information provided to the traffic control device comprises at least one of:
a vehicle identification number (VIN); and
a Unified Diagnostic Services (UDS) key.

5. The apparatus of claim 1, wherein the apparatus is associated with an emergency vehicle.

6. The apparatus of claim 1, wherein the apparatus is associated with an autonomous vehicle.

7. An apparatus, comprising: a memory; and circuitry configured to:
generate a traffic control public key and a traffic control private key in response to receiving, from a vehicle, a request to modify content of the memory;
provide the traffic control public key to the vehicle;
receive, in response to providing the traffic control public key, data from the vehicle, wherein the received data are encrypted, by the vehicle, using the traffic control public key;
decrypt the received data using the traffic control private key; and modify, based on the decrypted data, the content of the memory, wherein the apparatus is a traffic control device associated with a road.

8. The apparatus of claim 7, wherein the circuitry is configured to:
receive a vehicle public key, from the vehicle, along with the request to modify the content of the memory:
verify, prior to generating the traffic control public key and the traffic control private key, an identity of the vehicle based on the vehicle public key; and
generate, in response to verifying the identity of the vehicle, the traffic control public key and the traffic control private key.

9. The apparatus of claim 8, wherein the circuitry is configured to discard, in response to the vehicle not being verified, the data received from the vehicle.

10. The apparatus of claim 8, wherein the circuitry is configured to:
receive, from the vehicle, a vehicle public identification and a vehicle certificate along with the vehicle public key; and
compare, to verify the identity of the vehicle, the vehicle public key to an output of a decryption component, wherein the vehicle public identification, the vehicle certificate, and the vehicle public key are input into the decryption component.

11. The apparatus of claim 10, wherein the decryption component comprises a first decryptor and a second decryptor, and wherein the circuitry is configured to:
input the vehicle public key and the vehicle certificate into the first decryptor;
input the vehicle public key and an output of the first decryptor into the second decryptor; and
compare an output of the second decryptor to the vehicle public key.

12. The apparatus of claim 11, wherein the apparatus includes a traffic control component.

13. The apparatus of claim 12, wherein the apparatus is a traffic light.

14. The apparatus of claim 12, wherein the traffic control component includes a light element.

15. The apparatus of claim 12, wherein the apparatus is associated with a portion of a public road.

16. The apparatus of claim 12, wherein the apparatus is a node of a network comprising a plurality of traffic control devices.

17. A method, comprising:
verifying, in response to receiving a vehicle public key and a request to modify content of a traffic control device associated with a road from a vehicle, an identity of the vehicle based, at least in part, on the vehicle public key;
generating, by the traffic control device in response to verifying the identity of the vehicle, a traffic control public key and a traffic control private key;
receiving, in response to providing the traffic control public key to the vehicle, data corresponding to vehicle information that are encrypted based on the traffic control public key;
modifying, in response to decrypting the data using the traffic control private key, the content of the traffic control device based on the decrypted vehicle information.

18. The method of claim 17, wherein the method includes encrypting and decrypting the vehicle information using a device identification composition engine (DICE)-robust internet of thing (RIOT) protocol.

19. The method of claim 17, wherein the method includes not generating the traffic control public key and the traffic control private key in response to the vehicle not being verified.

20. A system, comprising:
a control node of a network;
an emergency vehicle configured to receive, from the control node, data corresponding to vehicle information; and
a plurality of traffic control devices, each associated with a respective portion of a road and in communication with the emergency vehicle and the control node, wherein each of the plurality of traffic control devices operates as a respective node of the network, and wherein each of the plurality of traffic control devices is configured to:
receive, from the emergency vehicle, a vehicle public key and a request to modify content of data stored in the respective traffic control device;
generate and provide, in response to verifying an identity of the emergency vehicle, a traffic control public key to the emergency vehicle, wherein the identity of the emergency vehicle is verified based on the received vehicle public key;
wherein the emergency vehicle is configured to:
encrypt the data corresponding to the vehicle information based on the traffic control public key;
provide, to at least one of the plurality of traffic control devices, the encrypted data;
wherein each of the plurality of traffic control devices is configured to decrypt the data corresponding to the vehicle information such that the emergency vehicle is configured to access the network via the vehicle information stored in the respective traffic control device.

21. The system of claim 20, wherein each traffic control device is configured to generate, along with the traffic control public key, a traffic control public identification and a traffic control certificate based, at least in part, on the vehicle public key received from the emergency vehicle.

22. The system of claim 21, wherein each traffic control device is configured to provide, back to the emergency vehicle, the traffic control public identification, the traffic control certificate, and the traffic control public key.

23. The system of claim 20, wherein the emergency vehicle comprises an asymmetric identification generator, and wherein the emergency vehicle is configured to generate a private vehicle identification along with the public vehicle identification using the asymmetric identification generator.

24. The system of claim 20, wherein the emergency vehicle comprises an asymmetric key generator, and wherein the emergency vehicle is configured to generate a vehicle private key along with the vehicle public key using the asymmetric key generator.

25. The system of claim 20, wherein each traffic control device is configured to:
generate a traffic control private key along with the traffic control public key based on a device secret of the respective traffic control device; and
provide the traffic control public key to the emergency vehicle;
wherein the emergency vehicle is configured to verify an identity of the respective traffic control device based on the traffic control public key.

26. The system of claim 20, wherein the control node is configured to determine a destination of the emergency vehicle and a route of the emergency vehicle though an area associated with the network to the destination.

27. The system of claim 26, wherein the control node is configured to determine the route of the emergency vehicle through the area based on a distance between the emergency vehicle and the destination.

28. The system of claim 26, wherein the control node is configured to determine the route of the emergency vehicle through the area based on an expected travel time to the destination.

29. The system of claim 26, wherein the control node is configured to determine the route of the emergency vehicle through the area based on traffic conditions within the area.

30. The system of claim 26, wherein the control node is configured to activate a respective green light associated with each of a subset of the plurality of traffic control devices associated with the determined route.

* * * * *